United States Patent
Dalal et al.

(10) Patent No.: US 11,226,870 B2
(45) Date of Patent: Jan. 18, 2022

(54) SYSTEMS AND METHODS FOR MARKING APPLICATION-CONSISTENT POINTS-IN-TIME

(71) Applicant: Veritas Technologies LLC, Santa Clara, CA (US)

(72) Inventors: Chirag Dalal, Pune (IN); Vaijayanti Bharadwaj, Pune (IN); Pradip Kulkarni, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 62 days.

(21) Appl. No.: 16/563,611

(22) Filed: Sep. 6, 2019

(65) Prior Publication Data

US 2021/0073082 A1    Mar. 11, 2021

(51) Int. Cl.
*G06F 12/00* (2006.01)
*G06F 11/14* (2006.01)
*G06F 3/06* (2006.01)
*G06F 9/455* (2018.01)

(52) U.S. Cl.
CPC .......... *G06F 11/1466* (2013.01); *G06F 3/061* (2013.01); *G06F 3/065* (2013.01); *G06F 3/0664* (2013.01); *G06F 3/0673* (2013.01); *G06F 9/45545* (2013.01); *G06F 9/45558* (2013.01); *G06F 11/1448* (2013.01); *G06F 2009/45579* (2013.01)

(58) Field of Classification Search
CPC ............. G06F 11/1466; G06F 11/1448; G06F 9/45545; G06F 3/061; G06F 3/0664
See application file for complete search history.

(56) References Cited

U.S. PATENT DOCUMENTS

| 10,191,755 B1* | 1/2019 | Natanzon ................ G06F 3/065 |
| 2011/0208908 A1* | 8/2011 | Chou ................... G06F 11/2038 711/112 |
| 2014/0181015 A1* | 6/2014 | Bonzini ................ G06F 16/273 707/613 |

(Continued)

OTHER PUBLICATIONS

International Search Report and Written Opinion received for PCT Application Serial No. PCT/US2020/049020 dated Nov. 23, 2020, 10 pages.

(Continued)

*Primary Examiner* — Arvind Talukdar
(74) *Attorney, Agent, or Firm* — FisherBroyles, LLP

(57) ABSTRACT

The disclosed computer-implemented method for marking application-consistent points-in-time may include intercepting, by an I/O filter, a write request from a guest virtual machine to a virtual machine disk and queueing the write request in an I/O filter queue. The method may include sending the write request to the virtual machine disk and receiving a write completion message from the virtual machine disk. The method may also include sending, in response to the write completion message, the write request to an I/O daemon, and queueing the write request in an I/O daemon queue. The method may further include sending the write completion message to the guest virtual machine, and sending the write request to a backup gateway such that the backup gateway mimics writes to the virtual machine disk. Various other methods, systems, and computer-readable media are also disclosed.

20 Claims, 6 Drawing Sheets

(56) References Cited

U.S. PATENT DOCUMENTS

| | | | |
|---|---|---|---|
| 2014/0281131 A1* | 9/2014 | Joshi | G06F 12/0868 |
| | | | 711/103 |
| 2017/0316030 A1 | 11/2017 | Shetty et al. | |
| 2018/0088804 A1* | 3/2018 | Mummidi | G06F 3/061 |
| 2018/0143879 A1 | 5/2018 | Dornemann | |

OTHER PUBLICATIONS

Cully et al., "Remus: High Availability via Asynchronous Virtual Machine Replication", URL: https://www.usenix.org/events/nsdi08/tech/full papers/cully/cully.pdf, 5th USENIX Symposium on Networked Systems Design and Implementation, USENIX Association, Feb. 25, 2019, pp. 161-174.

Cui et al., "Enhancing Reliability for Virtual Machines via Continual Migration", 15th International Conference on Parallel and Distributed Systems, IEEE, Dec. 8, 2009, pp. 937-942.

* cited by examiner

SYSTEMS AND METHODS FOR MARKING APPLICATION-CONSISTENT POINTS-IN-TIME

BACKGROUND

Enterprise computing environments often utilize virtual machine services for deploying and maintaining various computing environments. The virtual machine services may include specialized hardware and/or software for emulating computer systems. As the emulated computer systems become more robust and complicated, they are more capable of storing and processing data. Organizations have become increasingly reliant on virtual machine services for managing their data.

Conventional virtual machine services may provide administrative functions. For example, conventional virtual machine services may provide a built-in data backup function such as taking a snapshot of the computing environment. However, taking the snapshot may negatively affect performance. Even after the snapshot is released, the performance hit may linger.

The present disclosure, therefore, identifies and addresses a need for systems and methods for marking application-consistent points-in-time.

SUMMARY

As will be described in greater detail below, the present disclosure describes various systems and methods for marking application-consistent points-in-time.

In one embodiment, a method for marking application-consistent points-in-time may include (a) intercepting, by an input/output (I/O) filter, a write request from a guest virtual machine to a virtual machine disk, (b) queueing the write request in an I/O filter queue, (c) sending, based on the I/O filter queue, the write request to the virtual machine disk, (d) receiving, by the I/O filter, a write completion message from the virtual machine disk, (e) sending, by the I/O filter in response to the write completion message, the write request to an I/O daemon, (f) queueing the write request in an I/O daemon queue, (g) sending the write completion message to the guest virtual machine, and (h) sending, based on the I/O daemon queue, the write request to a backup gateway such that the backup gateway mimics writes to the virtual machine disk.

In some embodiments, the method may further comprise (i) receiving, from a backup requester on the guest virtual machine, a message to mark an application-consistent point-in-time for the virtual machine disk, (ii) pausing new write requests for the virtual machine disk, (iii) completing pending write requests for the virtual machine disk in the I/O filter, (iv) receiving, by the I/O filter, a flush completion message in response to completing the pending write requests, (v) setting, by the I/O daemon, a marker in the I/O daemon queue to mark the application-consistent point-in-time, and (vi) permitting, in response to setting the marker, new write requests from the guest virtual machine.

In some embodiments, the method may further comprise sending, from the backup gateway to the backup requester in response to receiving the message, a virtual machine identifier for the guest virtual machine, sending, from the backup requester to the I/O daemon, the virtual machine identifier, and pausing new write requests by the guest virtual machine.

In some embodiments, the method may further comprise sending the marker to the backup gateway after all write requests before the application-consistent point-in-time and before the new write requests.

In some embodiments, the backup gateway may maintain a mimicked copy of the virtual machine disk. In some embodiments, queueing the write request in the I/O daemon queue may comprise queueing the write request with a sequence identifier. In some embodiments, the backup gateway may mimic the writes to the virtual machine disk asynchronously.

In some embodiments, sending the write request to the backup gateway may further comprise sending the write request based on the sequence identifier to maintain an ordered sequence of write requests from the guest virtual machine.

In one example, a system for marking application-consistent points-in-time may include at least one physical processor and physical memory comprising computer-executable instructions that, when executed by the physical processor, cause the physical processor to (a) intercept, by an input/output (I/O) filter, a write request from a guest virtual machine to a virtual machine disk, (b) queue the write request in an I/O filter queue, (c) send, based on the I/O filter queue, the write request to the virtual machine disk, (d) receive, by the I/O filter, a write completion message from the virtual machine disk, (e) send, by the I/O filter in response to the write completion message, the write request to an I/O daemon, (f) queue the write request in an I/O daemon queue, (g) send the write completion message to the guest virtual machine, and (h) send, based on the I/O daemon queue, the write request to a backup gateway such that the backup gateway mimics writes to the virtual machine disk.

In some embodiments, the instructions may further comprise instructions for: (i) receiving, from a backup requester on the guest virtual machine, a message to mark an application-consistent point-in-time for the virtual machine disk, (ii) pausing new write requests for the virtual machine disk, (iii) completing pending write requests for the virtual machine disk in the I/O filter, (iv) receiving, by the I/O filter, a flush completion message in response to completing the pending write requests, (v) setting, by the I/O daemon, a marker in the I/O daemon queue to mark the application-consistent point-in-time, and (vi) permitting, in response to setting the marker, new write requests from the guest virtual machine.

In some embodiments, the instructions may further comprise instructions for sending, from the backup gateway to the backup requester in response to receiving the message, a virtual machine identifier for the guest virtual machine, sending, from the backup requester to the I/O daemon, the virtual machine identifier, and pausing new write requests by the guest virtual machine.

In some embodiments, the instructions may further comprise instructions for sending the marker to the backup gateway after all write requests before the application-consistent point-in-time and before the new write requests.

In some embodiments, the instructions for queueing the write request in the I/O daemon queue may comprise instructions for queueing the write request with a sequence identifier. In some embodiments, the instructions for sending the write request to the backup gateway may further comprise instructions for sending the write request based on the sequence identifier to maintain an ordered sequence of write requests from the guest virtual machine.

In some embodiments, the backup gateway may maintain a mimicked copy of the virtual machine disk. In some embodiments, the backup gateway may mimic the writes to the virtual machine disk asynchronously.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (a) intercept, by an input/output (I/O) filter, a write request from a guest virtual machine to a virtual machine disk, (b) queue the write request in an I/O filter queue, (c) send, based on the I/O filter queue, the write request to the virtual machine disk, (d) receive, by the I/O filter, a write completion message from the virtual machine disk, (e) send, by the I/O filter in response to the write completion message, the write request to an I/O daemon, (f) queue the write request in an I/O daemon queue, (g) send the write completion message to the guest virtual machine, and (h) send, based on the I/O daemon queue, the write request to a backup gateway such that the backup gateway mimics writes to the virtual machine disk.

In some embodiments, the instructions may further comprise instructions for (i) receiving, from a backup requester on the guest virtual machine, a message to mark an application-consistent point-in-time for the virtual machine disk, (ii) pausing new write requests for the virtual machine disk, (iii) completing pending write requests for the virtual machine disk in the I/O filter, (iv) receiving, by the I/O filter, a flush completion message in response to completing the pending write requests, (v) setting, by the I/O daemon, a marker in the I/O daemon queue to mark the application-consistent point-in-time, and (vi) permitting, in response to setting the marker, new write requests from the guest virtual machine.

In some embodiments, the instructions may further comprise instructions for sending, from the backup gateway to the backup requester in response to receiving the message, a virtual machine identifier for the guest virtual machine, sending, from the backup requester to the I/O daemon, the virtual machine identifier, and pausing new write requests by the guest virtual machine.

In some embodiments, the instructions may further comprise instructions for sending the marker to the backup gateway after all write requests before the application-consistent point-in-time and before the new write requests.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
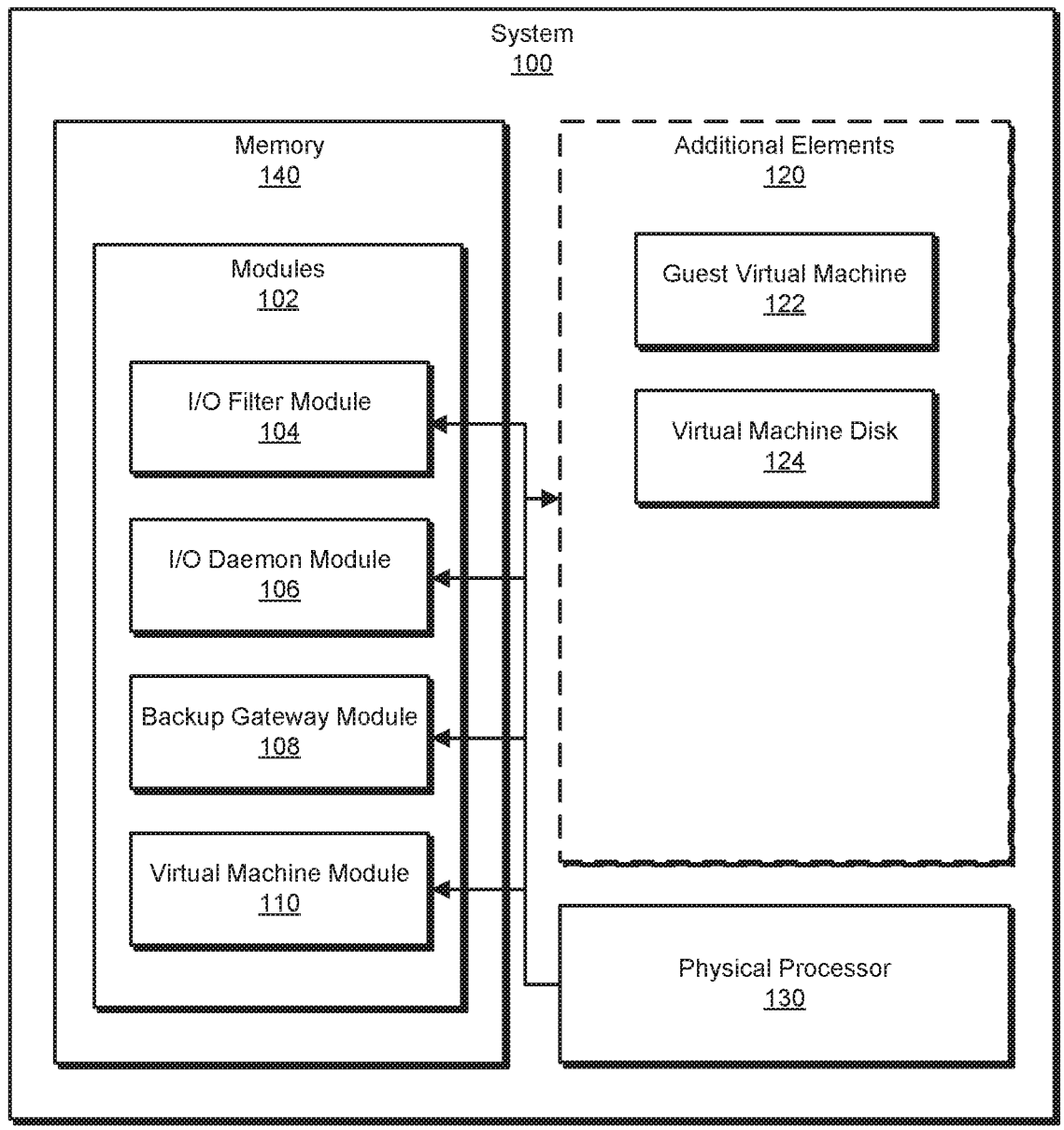
FIG. 1 is a block diagram of an example system for marking application-consistent points-in-time.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for marking application-consistent points-in-time. As will be explained in greater detail below, the various systems and methods described herein may be able to generate application-consistent points-in-time without using conventional virtual machine snapshot functions provided with virtual machine services. By intercepting and replicating write requests for a virtual machine disk, the systems and methods described herein may maintain a backup of the virtual disk. The systems and methods described herein may further queue the write requests in order to preserve an ordered sequence of the write requests. By queueing the write requests, the systems and methods described herein may accurately mimic the write operations on the virtual machine disk. In addition, the systems and methods described herein may asynchronously mimic the writes the virtual machine disk such that the backup operation is not necessarily prioritized over other operations. Therefore, the systems and methods described herein may facilitate faster backup operations. The systems and methods described herein may allow organizations to perform backup operations without a sustained drop in performance associated with conventional backup operations.

Moreover, the systems and methods described herein may also improve the functioning and/or performance of a virtual machine host device by asynchronously backing up the virtual machine disk. In addition, the systems and methods described herein may improve the fields of backup systems and virtual machine monitors by reducing the performance drop exhibited during conventional backup operations.

As used herein, the term "virtual machine" ("VM") generally refers to any operating system environment that is abstracted from computing hardware by a virtual machine manager (e.g., a hypervisor). As used herein, the term "hypervisor" generally refers to software, firmware, and/or hardware that creates and runs virtual machines. A computing device on which a hypervisor runs one or more virtual machines may be a host machine, and each virtual machine on the host machine may be a guest virtual machine.

As used herein, the term "application consistent" generally refers to a backup of files on disk that includes data in memory as well as data in pending I/O operations. The pending I/O operations may be flushed to disk in the correct transactional or sequential order such that the backup may contain consistent transactional information.

As used herein, the term "point-in-time" generally refers to a stable memory state of one or more applications, such as applications running on a guest virtual machine.

Examples of points-in-time include, without limitation, backup data, saved states, snapshots, etc.

Figure 2:
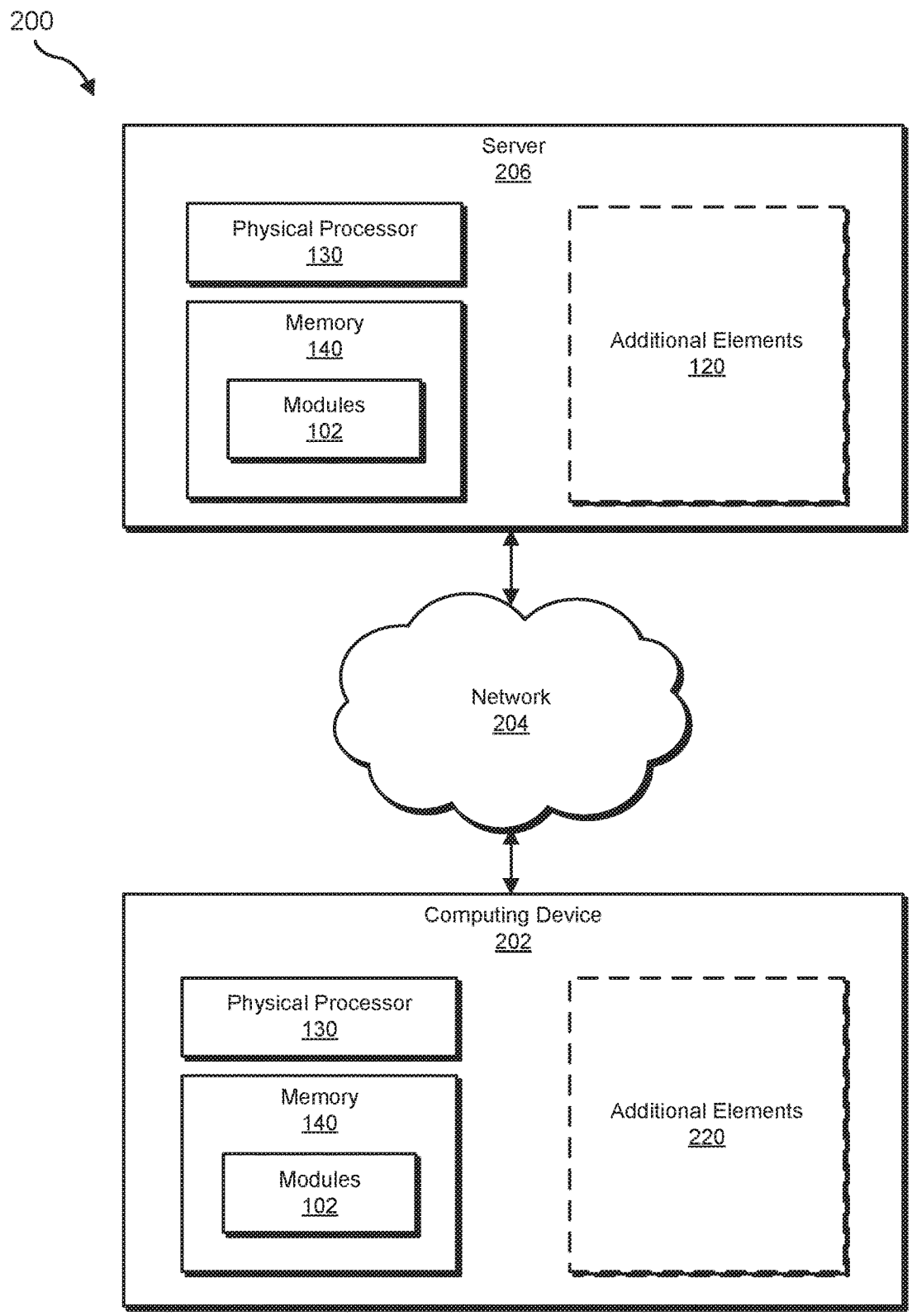
FIG. 2 is a block diagram of an additional example system for marking application-consistent points-in-time.
Figure 3:
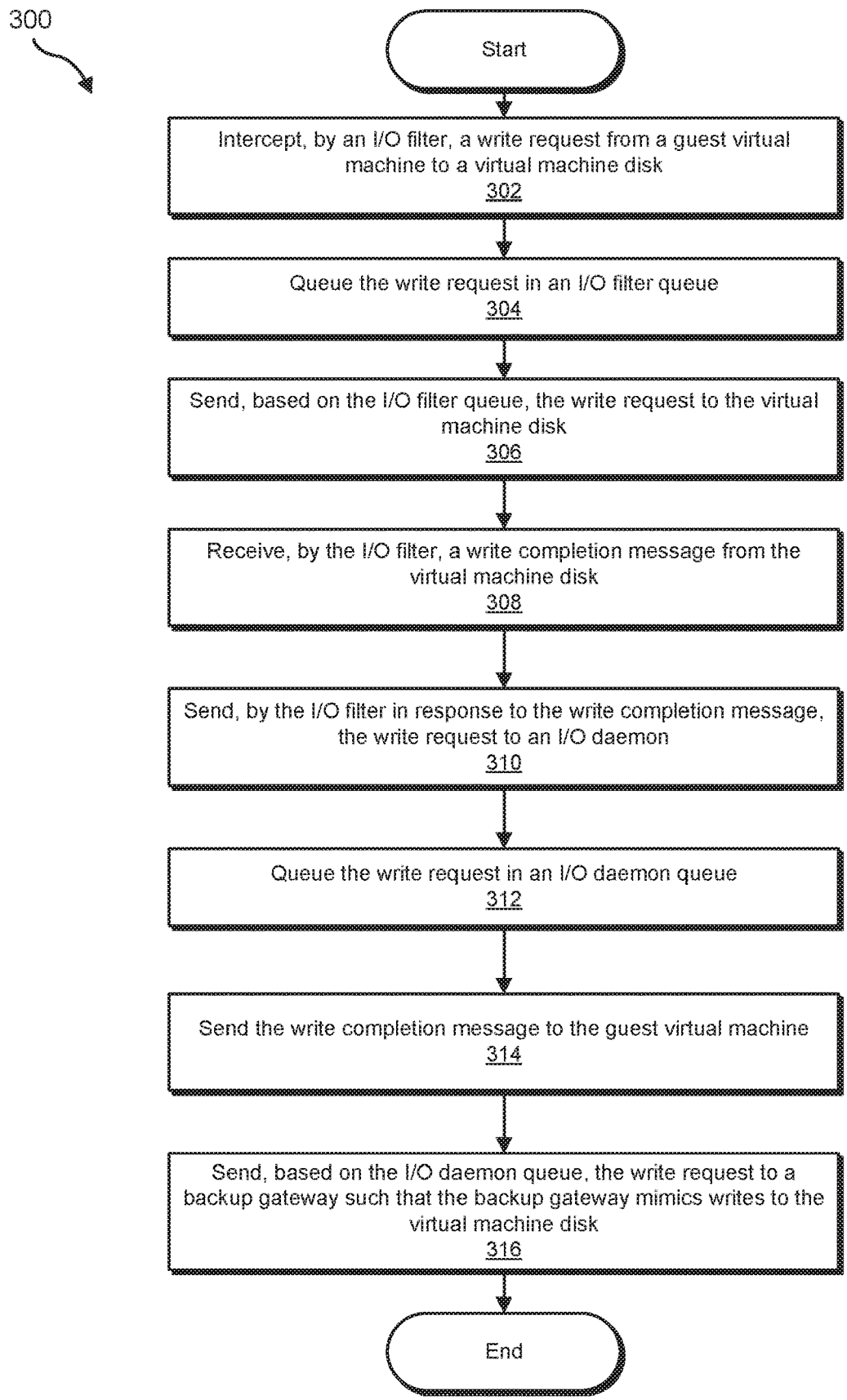
FIG. 3 is a flow diagram of an example method for marking application-consistent points-in-time.
Figure 4:
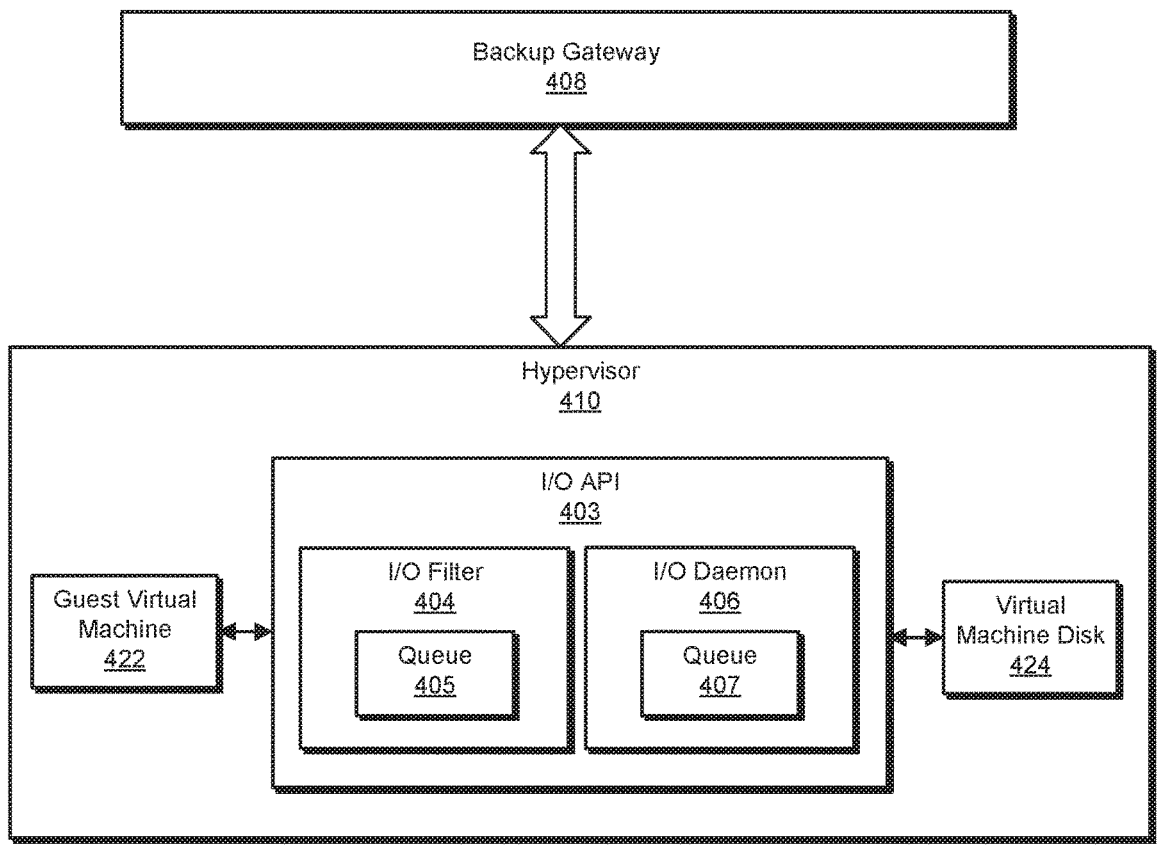
FIG. 4 is a block diagram of an example system for marking application-consistent points-in-time.

The following will provide, with reference to FIGS. 1, 2 and 4, detailed descriptions of example systems for marking application-consistent points-in-time. Detailed descriptions of corresponding computer-implemented methods will also be provided in connection with FIGS. 3 and 5. In addition, detailed descriptions of an example data flow will be provided in connection with FIG. 6.

FIG. 1 is a block diagram of an example system 100 for marking application-consistent points-in-time. As illustrated in this figure, example system 100 may include one or more modules 102 for performing one or more tasks. As will be explained in greater detail below, modules 102 may include an I/O filter module 104, an I/O daemon module 106, a backup gateway module 108, and a virtual machine module 110. Although illustrated as separate elements, one or more of modules 102 in FIG. 1 may represent portions of a single module or application.

I/O filter module 104 may be configured to intercept input/output requests. I/O daemon module 106 may be configured as a background process for managing input/output requests. Backup gateway module 108 may be configured to provide a backup service for virtual machines managed by virtual machine module 110. Virtual machine module 110 may be configured to monitor and/or manage one or more virtual machines, such as a guest virtual machine 122. Virtual machine module 110 may be a hypervisor or other virtual machine monitor. Backup gateway module 108 may be implemented separately from virtual machine module 110.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate marking application-consistent points-in-time. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120, such as guest virtual machine 122 and virtual machine disk 124. Guest virtual machine 122 may be a virtual machine run and managed by virtual machine module 110. Virtual machine disk 124 may be a storage, which may be implemented with hardware and/or software, maintained by virtual machine module 110 and accessible by guest virtual machine 122. For example, applications running on guest virtual machine 122 may read and/or modify data stored on virtual machine disk 124.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to create application-consistent points-in-time.

Computing device 202 generally represents any type or form of computing device capable of reading computer-executable instructions. Computing device 202 may be an endpoint device connecting to a virtual machine. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that is capable of running virtual machines. Server 206 may be a server running virtual machines with a data backup service. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for marking application-consistent points-in-time. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may intercept, by an input/output (I/O) filter, a write request from a guest virtual machine to a virtual machine disk. For example, I/O filter module 104 may, as part of computing device 202 in FIG. 2, intercept a write request from guest virtual machine 122 to virtual machine disk 124.

The term "write request," as used herein, generally refers to a command to write or otherwise modify data to a memory and/or storage device. Software, firmware, hardware, etc. may generate write requests. Examples of write requests include, without limitation, writing new data, modifying stored data, erasing stored data, etc.

The systems described herein may perform step 302 in a variety of ways. In one example, such as example system 400 illustrated in FIG. 4, an I/O filter 404 may intercept a write request from a guest virtual machine 422 to a virtual machine disk 424. System 400 may include a backup gateway 408 and a hypervisor 410.

Backup gateway 408 may correspond to backup gateway module 108. The term "backup gateway," as used herein, generally refers to a data backup service capable of backing up data from virtual machines.

Hypervisor 410, which may correspond to virtual machine module 110, may include guest virtual machine 422, an I/O API 403, and virtual machine disk 424. Guest virtual machine 422, which may correspond to guest virtual machine 122, may be a guest virtual machine monitored by hypervisor 410. I/O API 403 may be an application programming interface ("API") for input and output (e.g., reading, writing, modifying, and/or erasing data) operations for hypervisor 410.

As used herein, the term "API" may refer to communication protocols and/or subroutine definitions for communication amongst components. I/O API 403 may include an I/O filter 404, which may correspond to I/O filter module 104, and an I/O daemon 406, which may correspond to I/O daemon module 106. I/O filter 404 may include a queue 405 for queueing write requests. I/O daemon 406 may include a queue 407 for queueing write requests. Virtual machine disk 425 may correspond to virtual machine disk 124.

Returning to FIG. 3, at step 304 one or more of the systems described herein may queue the write request in an I/O filter queue. For example, I/O filter module 104 may, as part of computing device 202 in FIG. 2, queue the write request in a queue associated with I/O filter module 104.

The systems described herein may perform step 304 in a variety of ways. In one example, I/O filter 404 may queue, in queue 405, a write request from guest virtual machine 422 for virtual machine disk 424. Queue 405 may be configured to maintain an ordered sequence of the write requests in order of being issued by guest virtual machine 422. For instance, queue 405 may be a first-in-first-out ("FIFO") queue in which elements are removed from the queue in the same order they were place in the queue. Alternatively, each write request may be associated with a sequence identifier based on order of issuance by guest virtual machine 422. In some examples, the write requests may not be queued in queue 405 in the same order as issued by guest virtual machine 422. The sequence identifier may be used to maintain the same order.

At step 306 one or more of the systems described herein may send, based on the I/O filter queue, the write request to the virtual machine disk. For example, I/O filter module 104 may, as part of computing device 202 in FIG. 2, send the write request to virtual machine disk 124.

The systems described herein may perform step 306 in a variety of ways. In one example, I/O filter 404 may send a next write request in queue 405 to virtual machine disk 424. I/O filter 404 may determine the next write request based on, for instance, an order within queue 405, a sequence identifier, etc.

At step 308 one or more of the systems described herein may receive, by the I/O filter, a write completion message from the virtual machine disk. For example, I/O filter module 104 may, as part of computing device 202 in FIG. 2, receive a write completion message from virtual machine disk 124.

The systems described herein may perform step 308 in a variety of ways. In one example, I/O filter 404 may receive a write completion message from virtual machine disk 424. The write completion message may indicate that virtual machine disk 424 successfully completed the write request sent at step 306. Completion of the write request may update or otherwise change a state of virtual machine disk 424. In some implementations, if virtual machine disk 424 does not sent, for example within a timeout period, the write completion message, or if virtual machine disk 424 sends a write failure message, I/O API 403 may instruct virtual machine disk 424 to reattempt the write request, or send the write failure message to guest virtual machine 422. I/O filter 404 may discard the write request from queue 405 if the write request fails.

At step 310 one or more of the systems described herein may send, by the I/O filter in response to the write completion message, the write request to an I/O daemon. For example, I/O filter module 104 may, as part of computing device 202 in FIG. 2, send the write request to I/O daemon module 106, in response to the write completion message.

The systems described herein may perform step 310 in a variety of ways. In one example, I/O filter 404 may, in response to the write completion message, send the write request to I/O daemon 406. I/O filter 404 may send the write request substantially immediately after receiving the write completion message from virtual machine disk 424. Alternatively, I/O filter 404 may send the write request after a delay, for example as part of a batch process sending multiple write requests.

At step 312 one or more of the systems described herein may queue the write request in an I/O daemon queue. For example, I/O daemon module 106 may, as part of computing device 202 in FIG. 2, queue the write request in a queue associated with I/O daemon module 106.

The systems described herein may perform step 312 in a variety of ways. In one example, I/O daemon 406 may queue the write request in queue 407. In some implementations, I/O filter 404 and I/O daemon 406 may share a queue such that queue 405 and queue 407 may be the same queue. In some implementations, each write request may be stored with status flags indicating, for instance, whether the write request has been sent and/or completed by virtual machine disk 424. In some implementations, I/O daemon 406 may queue the write request in queue 407 with the sequence identifier. In some implementations, I/O daemon 406 may queue the write request in queue 407 upon virtual disk 424 successfully completing the write request.

At step 314 one or more of the systems described herein may send the write completion message to the guest virtual machine. For example, I/O filter module 104 may, as part of computing device 202 in FIG. 2, send the write completion message to guest virtual machine 122.

The systems described herein may perform step 314 in a variety of ways. In one example, I/O filter 404 may send the write request to guest virtual machine 422. Guest virtual machine 422, and a user thereof, may then be notified as to the success of the write request. In some implementations, if the write request failed, guest virtual machine 422 and/or I/O API 403 may reattempt the write request with virtual machine disk 424.

At step 316 one or more of the systems described herein may send, based on the I/O daemon queue, the write request to a backup gateway such that the backup gateway mimics writes to the virtual machine disk. For example, I/O daemon module 106 may, as part of computing device 202 in FIG. 2, send the write request to backup gateway module 108.

The systems described herein may perform step 316 in a variety of ways. In one example, I/O daemon 406 may send the write request to backup gateway 408 based on queue 407. For example, I/O daemon 406 may send the write request based on the sequence identifier to maintain the ordered sequence of write requests from guest virtual machine 422.

Backup gateway 408 may maintain its own storage corresponding to virtual machine disk 424. Because backup gateway 408 performs the same write requests in the same order as performed by virtual machine disk 424, backup gateway 408 may maintain a mimicked copy of virtual machine disk. In some implementations, backup gateway 408 may asynchronously mimic the writes to virtual machine disk 424. For example, backup gateway 408 may exhibit a delay in performing the write request after successful completion by virtual machine disk 424.

Figure 5:
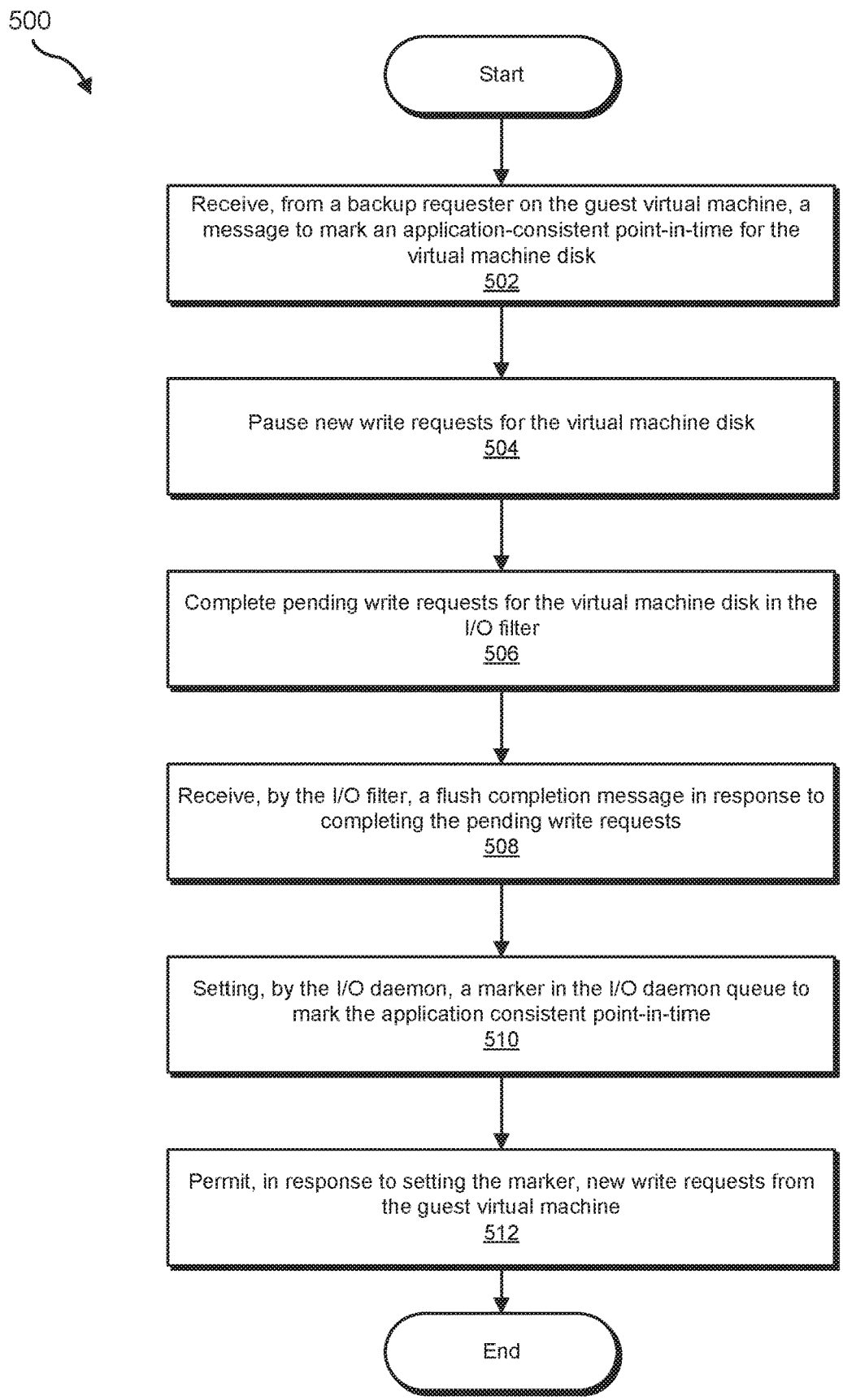
FIG. 5 is a flow diagram of an example method for marking application-consistent points-in-time.

FIG. 5 is a flow diagram of an example computer-implemented method 500 for marking application-consistent points-in-time. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 502 one or more of the systems described herein may receive, from a backup requester on the guest virtual machine, a message to mark an application-consistent point-in-time for the virtual machine disk. For example, backup gateway module 108 may, as part of computing device 202 in FIG. 2, receive from guest virtual machine 122 a message to mark an application-consistent point-in-time for virtual machine disk 124.

Figure 6:
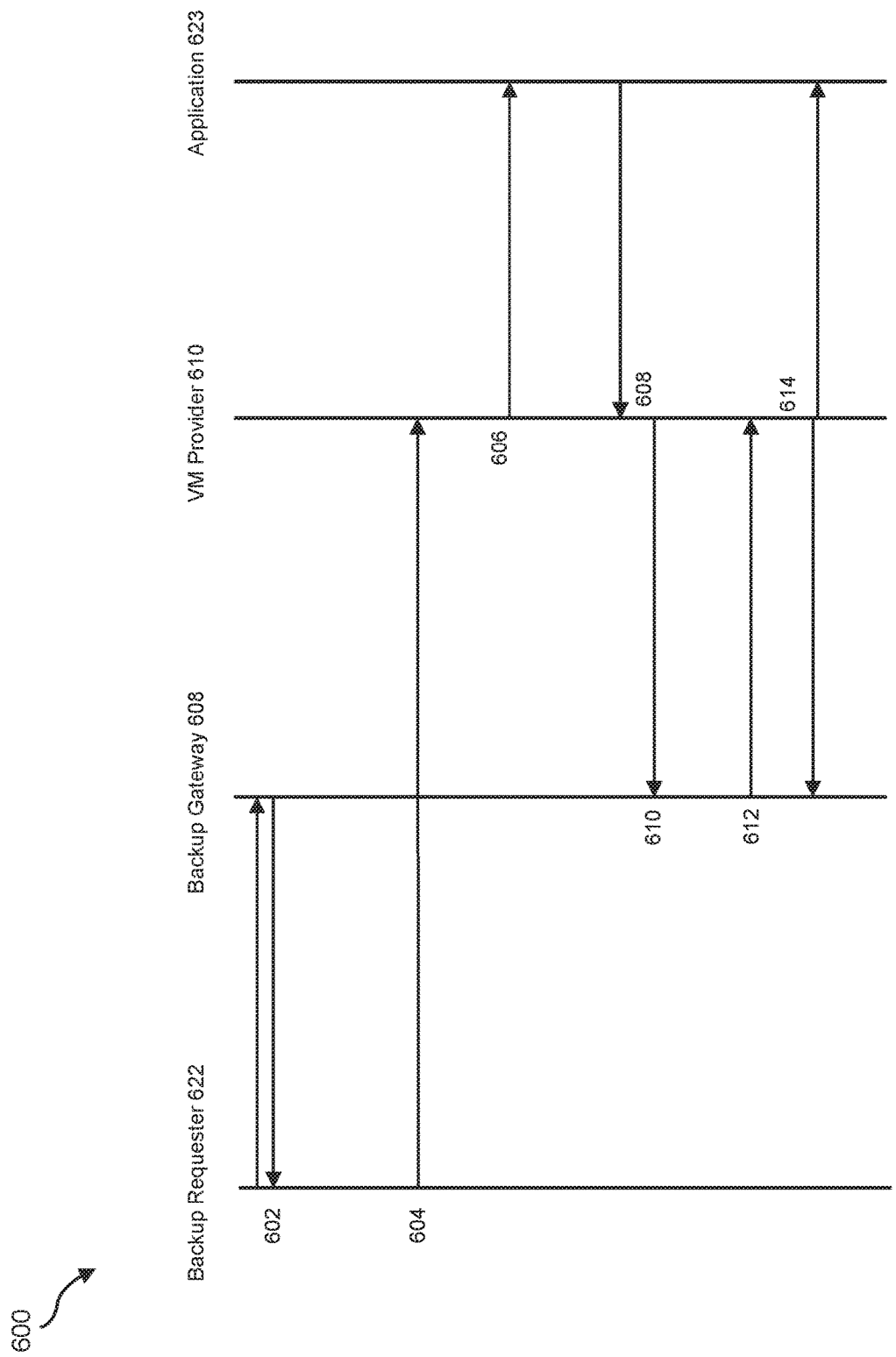
FIG. 6 is a diagram of an example data flow for marking application-consistent points-in-time.

The systems described herein may perform step 502 in a variety of ways. In one example, backup gateway 408 may receive a message from guest virtual machine 422 to mark an application-consistent point-in-time for virtual machine disk 424. FIG. 6 illustrates an example data flow 600 for a backup requester 622, a backup gateway 608, a VM provider 610, and an application 623.

Backup requester 622 may correspond to a guest virtual machine, such as guest virtual machine 122 and/or guest virtual machine 422. Backup gateway 608 may correspond to a backup gateway service, such as backup gateway module 108 and/or backup gateway 408. VM provider 610 may correspond to a virtual machine monitor and other components, such as I/O filter module 104, I/O daemon module 106, virtual machine module 110, virtual machine disk 124, I/O API 403, and/or virtual machine disk 424. Application 623 may correspond to an application, process, or other software, such as a writer, which may access and modify virtual machine disk 624.

As illustrated in FIG. 6, at 602 backup requester 622 may send a message to backup gateway 608 to mark the application-consistent point-in-time. Backup gateway 608 may then connect to backup requester 622 for communicating parameters, such as attributes/identifiers for the guest virtual machine, I/O daemon, etc. For example, in response to receiving the message, backup gateway 608 may send to backup requested 622 a virtual machine identifier for the guest virtual machine.

Turning back to FIG. 5, at step 504 one or more of the systems described herein may pause new write requests for the virtual machine disk. For example, I/O daemon module 106 may, as part of computing device 202 in FIG. 2, pause new write requests for virtual machine disk 124.

The systems described herein may perform step 504 in a variety of ways. In one example, guest virtual machine 422 may engage I/O API 403 for pausing new write requests for virtual machine disk 424. More specifically, I/O daemon 406 may pause new write requests.

At 604 in FIG. 6, backup requester 622 may send a request to VM provider 610 to quiesce any writers (e.g., applications). The term "quiesce," as used herein, generally refers to pausing, suspending, or otherwise altering an application and/or device, for instance, to achieve a consistent state. Quiescing an application may include pausing new writes and flushing any outstanding writes.

Backup requester 622 may send to the I/O daemon, the parameters received from backup gateway 608, including the virtual machine identifier. At 606, the I/O daemon of VM provider 610 may quiesce application 623. For example, in FIG. 4, I/O daemon 406 may quiesce the applications running on guest virtual machine 422 in order to pause new write requests by guest virtual machine 422. Quiescing the applications may also include flushing outstanding writes and any data in memory to the virtual machine disk. At 608, application 623 may flush pending writes to the I/O filter. For instance, I/O filter 404 may queue the pending writes into queue 405.

Returning to FIG. 5, at step 506 one or more of the systems described herein may complete pending write requests for the virtual machine disk in the I/O filter. For example, I/O filter module 104 may, as part of computing device 202 in FIG. 2, complete pending write requests for virtual machine disk 124.

The systems described herein may perform step 506 in a variety of ways. In one example, I/O filter 404 may complete pending write requests that are queued in queue 405. Because I/O daemon 406 has quiesced applications, queue 405 may not include any new writes generated after the message to mark the application-consistent point-in-time.

At step 508 one or more of the systems described herein may receive, by the I/O filter, a flush completion message in response to completing the pending write requests. For example, I/O filter module 104 may, as part of computing device 202 in FIG. 2, received a flush completion message from virtual disk 124 indicating completion of the pending write requests.

The systems described herein may perform step 508 in a variety of ways. In one example, virtual machine disk 424 may, after completing the pending writes, send the flush completion message to I/O filter 404. At this time, virtual machine disk 424 may be in a stable, consistent state corresponding to when the message to mark the application-consistent point-in-time was sent.

At step 510 one or more of the systems described herein may set, by the I/O daemon, a marker in the I/O daemon queue to mark the application-consistent point-in-time. For example, I/O daemon module 106 may, as part of computing device 202 in FIG. 2, set the marker in a queue associated with I/O daemon module 106.

The systems described herein may perform step 510 in a variety of ways. In one example, I/O daemon 406 may set a marker in queue 407 to mark the application-consistent point-in-time. The marker may indicate that all I/O requests for virtual machine disk 424 prior to the marker may form an application-consistent set of data. The marker may further serve as an I/O barrier separating I/O requests that are part of the application-consistent point-in-time from those that are not (e.g., new write requests). Because backup gateway 408 may asynchronously mimic write to virtual machine disk 424, backup gateway 408 may not immediately reflect the state of virtual machine disk 424. However, the marker may ensure that if backup gateway 408 performs all write requests in queue 407 up to the marker, backup gateway 408 will establish the same application-consistent point-in-time as virtual machine disk 424.

For example, at 610 in FIG. 6, VM provide 610 may provide queued write requests from the I/O daemon queue to backup gateway 608. Upon completion of the write requests, backup gateway 608 may send, at 612, a completion message to VM provider 610. At 612, backup gateway 608 may complete the application-consistent point-in-time. Although FIG. 6 illustrates 610 and 612 occurring before 614, which will be described further below, in other implementations 610 and 612 may occur after 614.

Returning to FIG. 5, at step 512 one or more of the systems described herein may permit, in response to setting the marker, new write requests from the guest virtual machine. For example, I/O daemon module 106 may, as part of computing device 202 in FIG. 2, permit new write requests from guest virtual machine 122 for virtual machine disk 124.

The systems described herein may perform step 512 in a variety of ways. In one example, I/O API 403 and/or I/O daemon 406 may permit applications on guest virtual machine 422 to write to virtual disk 424. Permitting new write requests may include unquiescing the applications.

In some implementations, I/O daemon 406 may engage hypervisor 410 to unquiesce the applications. For example, as illustrated in FIG. 6, at 614 VM provider 610 may unquiesce application 623. Application 623 may continue its operations.

In some implementations, I/O daemon 406 may send the marker to backup gateway 408 after all the write requests before the application-consistent point-in-time and before the new write requests. For instance, in FIG. 6, at 614, VM provider 610 may send the marker to backup gateway 608 before unquiescing application 623.

As explained above in connection with FIGS. 1-6, a backup gateway may asynchronously backup a VM. An exemplary system may include three subsystems: a guest VM configured with a backup requester, an I/O filter or tap implemented on the hypervisor, and a backup gateway for receiving the write stream intercepted by the I/O tap. The I/O tap may intercept I/O operations (e.g., the write stream) directed to the virtual machine disk. The I/O tap may then send the write stream to the virtual machine disk and asynchronously send a duplicate write stream to the backup gateway. When an application-consistent point-in-time is required, the backup gateway may connect to the backup requester on the guest VM. The backup requestor may engage the hypervisor to quiesce applications and flush all pending writes to the virtual machine disk. When the pending writes have been drained, the I/O tap may send a special event to mark the point-in-time. In response, the hypervisor may unquiesce the applications and resume normal operation.

Because the backup gateway asynchronously duplicates the write stream, when a backup operation is requested, the virtual machine host may backup the virtual machine disk without requiring other operations to wait while the backup completes. Thus, the systems and methods described herein may reduce potential performance bottlenecks during backup operations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for marking application-consistent points-in-time, at least a portion of the method being performed by a computing device comprising at least one processor, the method comprising:
   intercepting, by an input/output (I/O) filter, a write request from a guest virtual machine to a virtual machine disk;
   queueing the write request in an I/O filter queue, wherein the I/O filter queue comprises a first ordered sequence of write requests;
   sending, based on the I/O filter queue, the write request to the virtual machine disk;
   receiving, by the I/O filter, a write completion message from the virtual machine disk;
   sending, by the I/O filter in response to the write completion message, the write request to an I/O daemon;
   queueing, by the I/O daemon in response to the write completion message, the write request in an I/O daemon queue, wherein the I/O daemon queue comprises a second ordered sequence of write requests;
   sending, by the I/O filter after queueing the write request in the I/O daemon queue, the write completion message to the guest virtual machine; and
   sending, based on the I/O daemon queue, the write request to a backup gateway such that the backup gateway mimics writes to the virtual machine disk.

2. The method of claim 1, further comprising:
   receiving, from a backup requester on the guest virtual machine, a message to mark an application-consistent point-in-time for the virtual machine disk;
   pausing new write requests for the virtual machine disk;
   completing pending write requests for the virtual machine disk in the I/O filter;
   receiving, by the I/O filter, a flush completion message in response to completing the pending write requests;
   setting, by the I/O daemon, a marker in the I/O daemon queue to mark the application-consistent point-in-time; and
   permitting, in response to setting the marker, new write requests from the guest virtual machine.

3. The method of claim 2, further comprising:
   sending, from the backup gateway to the backup requester in response to receiving the message, a virtual machine identifier for the guest virtual machine;

sending, from the backup requester to the I/O daemon, the virtual machine identifier; and pausing new write requests by the guest virtual machine.

4. The method of claim 2, further comprising sending the marker to the backup gateway after all write requests before the application-consistent point-in-time and before the new write requests.

5. The method of claim 1, wherein the backup gateway maintains a mimicked copy of the virtual machine disk.

6. The method of claim 1, wherein queueing the write request in the I/O daemon queue comprises queueing the write request with a sequence identifier.

7. The method of claim 6, wherein sending the write request to the backup gateway further comprises sending the write request based on the sequence identifier to maintain an ordered sequence of write requests from the guest virtual machine.

8. The method of claim 1, wherein the backup gateway mimics the writes to the virtual machine disk asynchronously.

9. A system for marking application-consistent points-in-time, the system comprising:
   at least one physical processor;
   physical memory comprising computer-executable instructions that, when executed by the physical processor, cause the physical processor to:
   intercept, by an input/output (I/O) filter, a write request from a guest virtual machine to a virtual machine disk;
   queue the write request in an I/O filter queue, wherein the I/O filter queue comprises a first ordered sequence of write requests;
   send, based on the I/O filter queue, the write request to the virtual machine disk;
   receive, by the I/O filter, a write completion message from the virtual machine disk;
   send, by the I/O filter in response to the write completion message, the write request to an I/O daemon;
   queue, by the I/O daemon in response to the write completion message, the write request in an I/O daemon queue, wherein the I/O daemon queue comprises a second ordered sequence of write requests;
   send, by the I/O filter after queueing the write request in the I/O daemon queue, the write completion message to the guest virtual machine; and
   send, based on the I/O daemon queue, the write request to a backup gateway such that the backup gateway mimics writes to the virtual machine disk.

10. The system of claim 9, wherein the instructions further comprise instructions for:
   receiving, from a backup requester on the guest virtual machine, a message to mark an application-consistent point-in-time for the virtual machine disk;
   pausing new write requests for the virtual machine disk;
   completing pending write requests for the virtual machine disk in the I/O filter;
   receiving, by the I/O filter, a flush completion message in response to completing the pending write requests;
   setting, by the I/O daemon, a marker in the I/O daemon queue to mark the application-consistent point-in-time; and
   permitting, in response to setting the marker, new write requests from the guest virtual machine.

11. The system of claim 10, wherein the instructions further comprise instructions for:

sending, from the backup gateway to the backup requester in response to receiving the message, a virtual machine identifier for the guest virtual machine;

sending, from the backup requester to the I/O daemon, the virtual machine identifier; and pausing new write requests by the guest virtual machine.

12. The system of claim 10, wherein the instructions further comprise instructions for sending the marker to the backup gateway after all write requests before the application-consistent point-in-time and before the new write requests.

13. The system of claim 9, wherein the backup gateway maintains a mimicked copy of the virtual machine disk.

14. The system of claim 9, wherein the instructions for queueing the write request in the I/O daemon queue comprises instructions for queueing the write request with a sequence identifier.

15. The system of claim 14, wherein the instructions for sending the write request to the backup gateway further comprises instructions for sending the write request based on the sequence identifier to maintain an ordered sequence of write requests from the guest virtual machine.

16. The system of claim 9, wherein the backup gateway mimics the writes to the virtual machine disk asynchronously.

17. A non-transitory computer-readable medium comprising one or more computer-executable instructions that, when executed by at least one processor of a computing device, cause the computing device to:
   intercept, by an input/output (I/O) filter, a write request from a guest virtual machine to a virtual machine disk;
   queue the write request in an I/O filter queue, wherein the I/O filter queue comprises a first ordered sequence of write requests;
   send, based on the I/O filter queue, the write request to the virtual machine disk;
   receive, by the I/O filter, a write completion message from the virtual machine disk;
   send, by the I/O filter in response to the write completion message, the write request to an I/O daemon;
   queue, by the I/O daemon in response to the write completion message, the write request in an I/O daemon queue, wherein the I/O daemon queue comprises a second ordered sequence of write requests;
   send, by the I/O filter after queueing the write request in the I/O daemon queue, the write completion message to the guest virtual machine; and
   send, based on the I/O daemon queue, the write request to a backup gateway such that the backup gateway mimics writes to the virtual machine disk.

18. The non-transitory computer-readable medium of claim 17, wherein the instructions further comprise instructions for:
   receiving, from a backup requester on the guest virtual machine, a message to mark an application-consistent point-in-time for the virtual machine disk;
   pausing new write requests for the virtual machine disk;
   completing pending write requests for the virtual machine disk in the I/O filter;
   receiving, by the I/O filter, a flush completion message in response to completing the pending write requests;
   setting, by the I/O daemon, a marker in the I/O daemon queue to mark the application-consistent point-in-time; and
   permitting, in response to setting the marker, new write requests from the guest virtual machine.

19. The non-transitory computer-readable medium of claim 18, wherein the instructions further comprise instructions for:
- sending, from the backup gateway to the backup requester in response to receiving the message, a virtual machine identifier for the guest virtual machine;
- sending, from the backup requester to the I/O daemon, the virtual machine identifier; and
- pausing new write requests by the guest virtual machine.

20. The non-transitory computer-readable medium of claim 18, wherein the instructions further comprise instructions for sending the marker to the backup gateway after all write requests before the application-consistent point-in-time and before the new write requests.

* * * * *